United States Patent [19]

Brown et al.

[11] Patent Number: 4,748,618

[45] Date of Patent: May 31, 1988

[54] TELECOMMUNICATIONS INTERFACE

[75] Inventors: Earl F. Brown, Piscataway; Robert V. Kline, Somerville, both of N.J.

[73] Assignee: Bell Communications Research, Inc., Livingston, N.J.

[21] Appl. No.: 865,871

[22] Filed: May 21, 1986

[51] Int. Cl.[4] .................... H04N 7/14; H04L 11/20
[52] U.S. Cl. .................................. 370/94; 370/62; 370/99; 379/202
[58] Field of Search .................... 379/53, 54, 202; 358/85; 370/60, 62, 94, 84, 99

[56] References Cited

U.S. PATENT DOCUMENTS

| Re. 31,182 | 3/1983 | Crager et al. | 370/60 |
|---|---|---|---|
| 3,796,835 | 3/1974 | Closs et al. | 370/60 |
| 4,004,084 | 1/1977 | Brown et al. | 358/133 |
| 4,135,156 | 1/1979 | Sanders, Jr. et al. | 370/94 |
| 4,203,001 | 5/1980 | Condon | 379/202 |
| 4,354,263 | 10/1982 | Bordry et al. | 370/60 |
| 4,431,992 | 2/1984 | Boulard et al. | 370/84 |
| 4,527,268 | 7/1985 | Dublet | 370/84 |
| 4,575,844 | 3/1986 | Kosuge et al. | 370/60 |
| 4,584,680 | 4/1986 | Carter et al. | 370/60 |
| 4,603,416 | 7/1986 | Servel et al. | 370/94 |
| 4,650,929 | 3/1987 | Boerger et al. | 379/54 |
| 4,656,626 | 4/1987 | Yudichak et al. | 370/99 |
| 4,674,033 | 6/1987 | Miller | 370/94 |

FOREIGN PATENT DOCUMENTS

| 0068949 | 4/1982 | Japan | 370/94 |
|---|---|---|---|
| 0175251 | 10/1984 | Japan . | |
| 8602512 | 4/1986 | PCT Int'l Appl. . | |

| 1173918 | 12/1969 | United Kingdom . |
|---|---|---|
| 2126841 | 3/1984 | United Kingdom . |

OTHER PUBLICATIONS

"The APO TV-Conferencing Facility", Telecommunications *Journal of Austrailia*, A. J. Seyler et al., 1973, vol. 23, No. 3, pp. 216–225.

Videoplex Brochure, Videoplex Inc., Model MDI-4/A TV Signal Multiplexer, 9-85.

*Primary Examiner*—Douglas W. Olms
*Assistant Examiner*—Melvin Marcelo
*Attorney, Agent, or Firm*—James W. Falk; Stephen M. Gurey

[57] ABSTRACT

A telecommunications interface is disclosed. The inventive telecommunications interface is capable of collecting multiple asynchronous video, audio, graphic and data signals from a variety of different kinds of sources and retransmitting such signals in a suitable form for display or detection with one or more types of receiver equipment at one or more locations. The interface operates at rates ranging from several hundred bits per second to several gigabits per second.

The telecommunications interface includes a dual port RAM whose input and output operate asynchronously. Signals from the user sources are stripped of timing and source identification information and are written into the dual port RAM, while output processors read previously stored user signals out from the dual port RAM. The output processor appropriately format the retrieved signals, which are then transmitted to the receiver equipment.

13 Claims, 3 Drawing Sheets

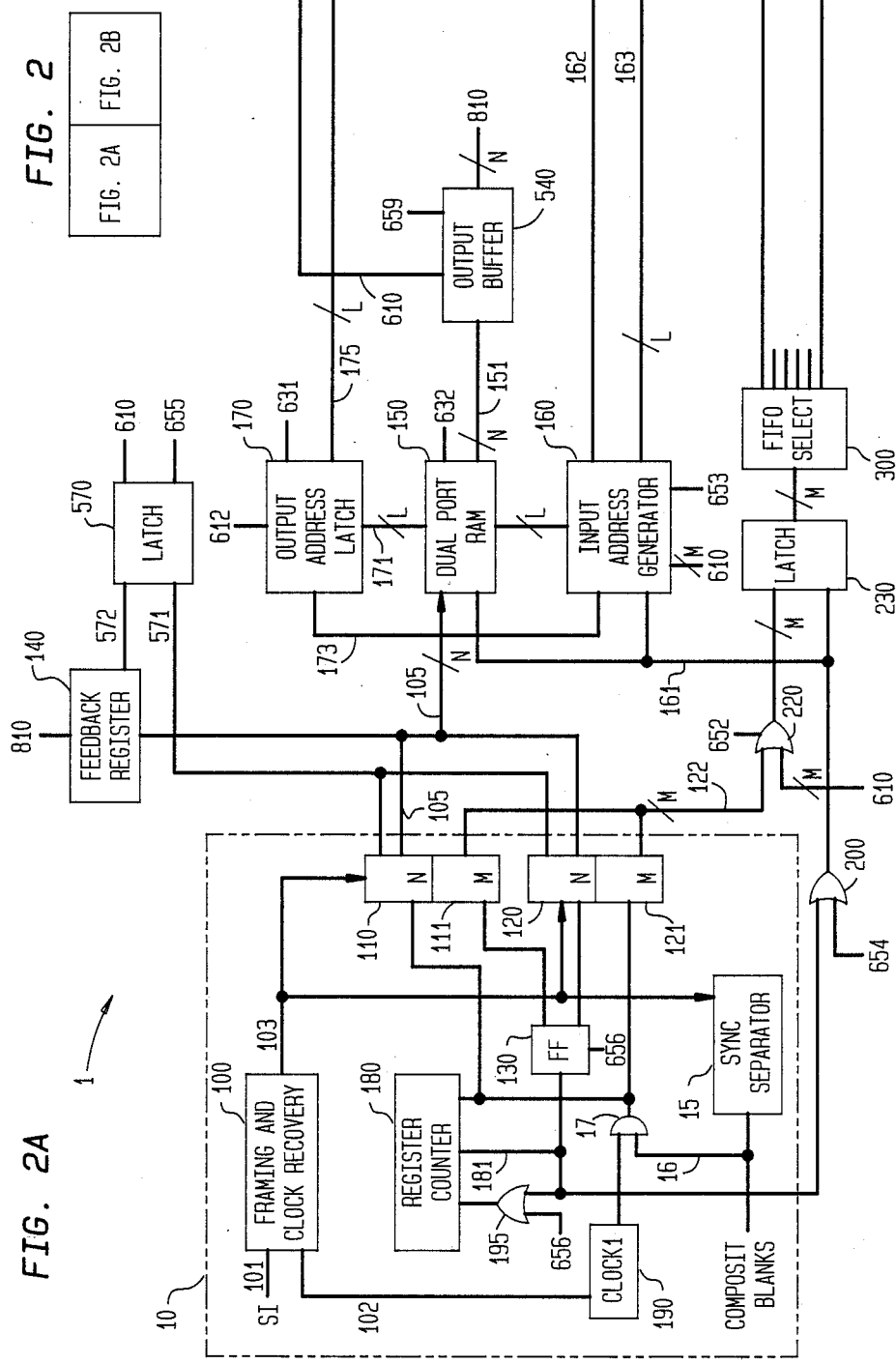

TELECOMMUNICATIONS INTERFACE

FIELD OF THE INVENTION

The present invention relates to a telecommunications interface which enables a variety of different communication devices, operating at a variety of different bit rates to exchange information. The telecommunications interface collects multiple asynchronous, video, audio, graphic and data signals from multiple locations and retransmits these signals in suitable format for detection and/or for display at one or more other locations.

BACKGROUND OF THE INVENTION

New transmission networks, including ISDN and fiber optic transmission networks are providing larger bandwidth than were heretofore available for network users. The availability of larger bandwidths has spawned a wide variety of enhanced communications services including for example high resolution video.

It is likely that individual users of wide bandwidth networks will each have a plurality of advanced telecommunication devices such as full motion television cameras, document scanning devices, and document display devices. Such document display devices may include an interactive device such as a light pen which will permit telewriting.

One use of high bandwidth networks and associated user communication devices is video-conferencing. Conferences may be set up between a plurality of users each having one or more of the user devices discussed above. For example, four users may wish to participate in a video conference, in which each user can simultaneously display information received from the other three users.

In the past, the capability of video-conferencing systems was limited by the available bandwidth. Such prior art video systems are discussed in Brown et al, U.S. Pat. No. 4,004,084 and A. J. Seylor et al, "The APO TV-Conferencing Facility", Telecommunications Journal of Australia, Vol. 23, No. 3 (1973) pp. 216–225. In particular, such prior art telecommunications systems, did not contemplate the wide variety of equipment that is presently available.

One problem in providing video-conferencing among a plurality of users, each having, for example, some or all of a full motion television camera, a document scanning device, and a document display device, is that different users can be expected to have different equipment made by different manufacturers, which equipment will operate at different bit rates using different protocols. Thus, the network, even if it has an appropriately large bandwidth, will need the capability of collecting multiple asynchronous video, audio, graphic and data signals from a variety of sources and retransmitting such signals in a suitable form for display or detection at a plurality of receiving stations having a variety of receiving equipment.

Accordingly, it is an object of the present invention to provide a telecommunications interface which is capable of receiving a multiplicity of signal types from a multiplicity of sources and is capable of retransmitting the signals in a suitable format to one or more locations having a variety of receiving equipment. Such an interface is desirably capable of functioning at bit rates up to the gigabit/second range.

SUMMARY OF THE INVENTION

The present invention is a telecommunications interface capable of operating at speeds ranging from several hundred bits per second to several gigabits per second. The interface is adapted to provide transmission rate conversion, and/or protocol conversion between a variety of dissimilar devices. The interface may also combine signals from two or more dissimilar sources for retransmission and display at yet a third type of device. The telecommunications interface may be located inside a telecommunications network or at a termination of the network.

The inventive telecommunications interface comprises a dual port memory. The dual port memory has an input and output which operate asynchronously, i.e. data is written into the memory at one address, while other data is being read out of the dual port memory from another address. Illustratively, the "throughput" of this memory is in the gigabit range.

Data, illustratively in packet format, may be written into the dual port memory from any one of a number of sources. Before being written into the dual port memory, data packets are stripped of timing, source identification, and other protocol type of information. Thus, only the user information to be transmitted through the interface is written into the dual port memory. The user information is fetched from the dual port memory through the use of one or more output processors. Each output processor is connected to one or more receiving devices such as a video display monitor or telefax device. The output processors reformat the data retrieved from the dual port memory so that it is appropriately formated for use by the associated receiving device. Thus, communication may be established between a particular source and a particular receiving device, by writing user data from the source into the dual port memory. This data is then fetched from the memory and routed to the appropriate output processor. The output processor reformats the data and sends it to the particular receiving device.

In addition to including a dual port memory, the telecommunications interface also includes an address generator and a plurality of address storage devices which illustratively are first in, first out (FIFO) memories. When a packet of data is received at the interface, the address generator generates the address in the dual port memory where this packet is to be stored. The packet is then written into the dual port memory at the address, and depending on the source of the packet and its destination, the address is then written into one of the address storage FIFO's. In other words user data is stored in the dual port memory, and address data is stored in the FIFO's. Although input data from various sources may be stored in random locations in the dual port memory, the addresses for the data are stored in an organized fashion in the FIFO's so that particular user data may be fetched from the dual port memory in the correct sequence. It is the address data stored in the FIFO's that permits particular output processors to fetch particular data from the dual port memory.

A particular output processor may access particular data from the dual port memory by sequentially causing the fetching of addresses from the appropriate FIFO (i.e. if output processor #2 wishes to access data from source #1, output processor #2 will cause the fetching of the dual port memory addresses of the data from source #1 from the particular FIFO which stores these addresses). The fetched addresses are then used to read the desired data from the dual port memory, which data is then routed to the appropriate output processor. The addresses of the accessed data are then routed back to the address generator so that these storage locations in the dual port memory can be used again. Thus, in an ongoing transmission between one source and one output processor, user data is steadily read into the dual port memory, and storage addresses of this data are continuously written into a particular FIFO. Addresses previously written into the FIFO are fetched from the FIFO so that data previously stored in the dual port memory may be accessed by the aforementioned one output processor.

The foregoing may be clarified by looking at a particular example. Consider a video-conference between four users. The telecommunications interface of the present invention serves as a video bridge between the four users. Video data from each of the four users is stored in the dual port memory. Illustratively, addresses for data from user #1 are stored in FIFO #1, addresses for data from user #2 are stored in FIFO #2, addresses for data from user #3 are stored in FIFO #3, addresses for data from user #4 are stored in FIFO #4. The output of data from the memory may be accomplished in a number of ways. Illustratively, one conferee may decide to look at a display of data from one other conferee. For example user #2 may wish to look at data from user #1 only. In this case, the output processor associated with user #2 causes the fetching of addresses from FIFO #1 and the accessing of the associated data from the dual port memory. Alternatively, user #2 may wish to display data from all four conferees including himself. In this case, addresses are sequentially fetched from all four FIFOs and the corresponding data read out of memory and sent to the output processor associated with user #2. However, depending on the resolution of user #2's video system, only one fourth of the data pointed to by each FIFO may be used. This example is discussed in greater detail below.

BRIEF DESCRIPTION OF THE DRAWING

In the drawings, like elements have the same identifying numerals.

DETAILED DESCRIPTION

1. Overview

Figure 1:
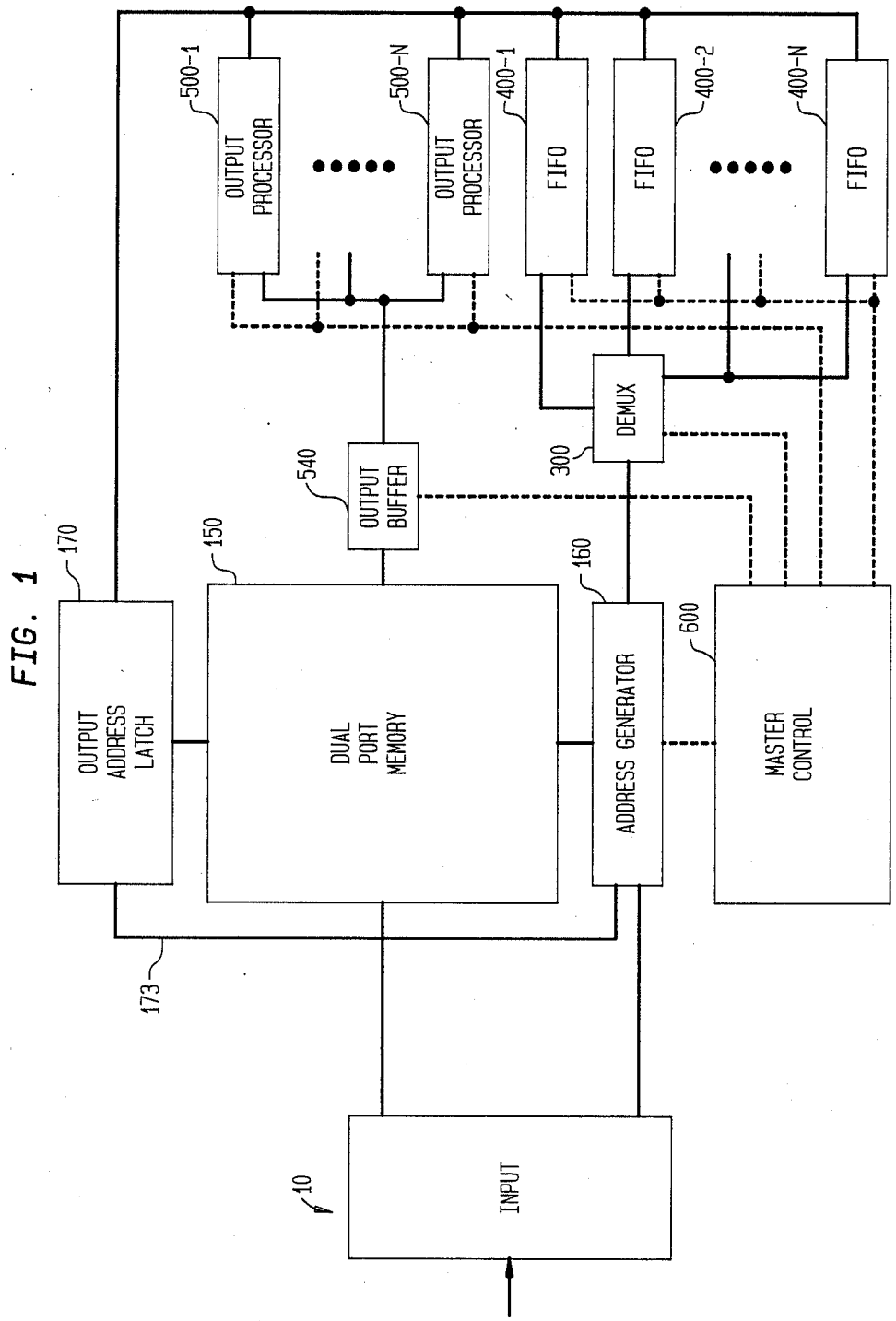
FIG. 1 is a highly schematic diagram of the main features of a telecommunications interface in accordance with an illustrative embodiment of the present invention.

FIG. 1 shows a high level block diagram of the inventive telecommunications interface. The interface may be located inside a telecommunications network or at a termination of the network. The basic objective of the interface is to provide transmission rate conversion, combination of input signals, and/or protocol conversion between dissimilar devices. Illustratively, data is received at input section 10 of the interface from one or more sources in digitized packet format. The data packets are routed through the dual port memory 150 to one or more of a plurality of output processors 500-1 . . . 500-N. Each of the output processors is connected to a receiving device such as a fax machine or video monitor, not shown.

The input section 10 performs functions such as framing, clock recovery, sync separation (for video and similarly formatted signals) and serial to parallel conversion for the inputting of data into the memory 150. Input data packets emerge from the input section 10 stripped of timing and source identification information. Only user information to be transmitted through the interface is inputted into the dual port memory 150.

The input address generator 160 can randomly access all locations in the memory 150 and has a "write" lock out capability for all locations in current use. The FIFO's 400-1,400-2 . . . 400-N store the addresses generated by the address generator 160 in an organized fashion. Thus, when a user data packet enters input section 10, the address generator 160 generates the address of a location in memory 150 where the packet is to be stored. This address is routed through demultiplexer circuitry 300 to a particular FIFO 400-1 . . . 400-N depending on the origin and type of the associated data packet, e.g. addresses of packets from different sources are routed to different FIFO memories.

Data is read from the memory 150 by using the addresses stored in the FIFOs. A particular one of the output processors 500-1 . . . 500-N can access selected data from the dual port memory 150, by fetching the addresses of this data from the appropriate FIFO(s) via master control 600. The fetched addresses access the memory 150 via the output address latch 170. After the data stored at a given address is read out of the memory 150, the address is routed back to the address generator 160 via line 173 so that this storage location may be used again. The data output of the memory 150 goes to an output buffer 540 which can be programmed to output the data to the appropriate output processor in serial or parallel format and at a rate selected by the master control 600. An output processor which receives data from the dual port memory 150 reformats this data so that the data can be received by the associated receiving device.

Thus, in an ongoing transmission between one source and one output processor and its associated receiver device, user data from the source is steadily written into the dual port memory 150, and storage addresses for this data are steadily written into a particular one of the FIFO's 400-1 . . . 400-N. Addresses previously written into the particular FIFO are fetched from the FIFO and used to access data from the source previously stored in the dual port memory 150. The fetched addresses are then routed back to the address generator so that these addresses can be used again. The data accessed from the dual port memory is then routed to the desired output processor for reformatting and further transmission to the receiving device.

Viewed another way, communication between particular sources and particular output processors 500-1 . . . 500-N and their associated receiving devices involves two mappings which are illustratively established under the control of the master control processor 600. A first mapping is established between data sources and the FIFO's 400-1 . . . 400-N so that the dual port memory addresses of data from particular sources are routed to particular FIFO's. This mapping is established by configuring the demultiplexing circuitry 300. A second mapping is established between the FIFO's 400-1 . . . 400-N and the output processors 500-1 . . . 500-N so that data stored at addresses fetched from particular FIFO's may be routed to particular output processors and their associated receiving devices. This second mapping is established by configuring the master control processor 600 itself. Illustratively, the two mappings are established by configuring the interface before it is used, for example prior to the start of a video conference.

The above described form of memory management maximizes the utilization of memory space, minimize contention problems, and increases the transport efficiency of data through the interface. Data need not be stored in memory 150 in any particular order, as the FIFO's keep track of where similar and dissimilar data is stored, and the input address generator keeps a record of how much address space is available for new data and the address locations that are available for that data.

A more detailed discussion of the operation of the transmission interface is presented below in connection with FIG. 2 which is a more detailed diagram of the inventive transmission interface.

2. Master Control

The master control 600 might be implemented using a number of standard processors depending on speed and/or control complexity requirements. Such processors include for example the Signetics 8×305 or 8×401, the Intel 8051, or the Motorola 68,000 family of microprocessors all of which have sufficient intelligence to control the interface. The bidirectional buses 610,611 plus control lines 631,632,651 . . . 659,660-1 . . . 660-N are used by the master control 600 to interact with other parts of the interface.

3. Input Data Flow

Figure 2B:
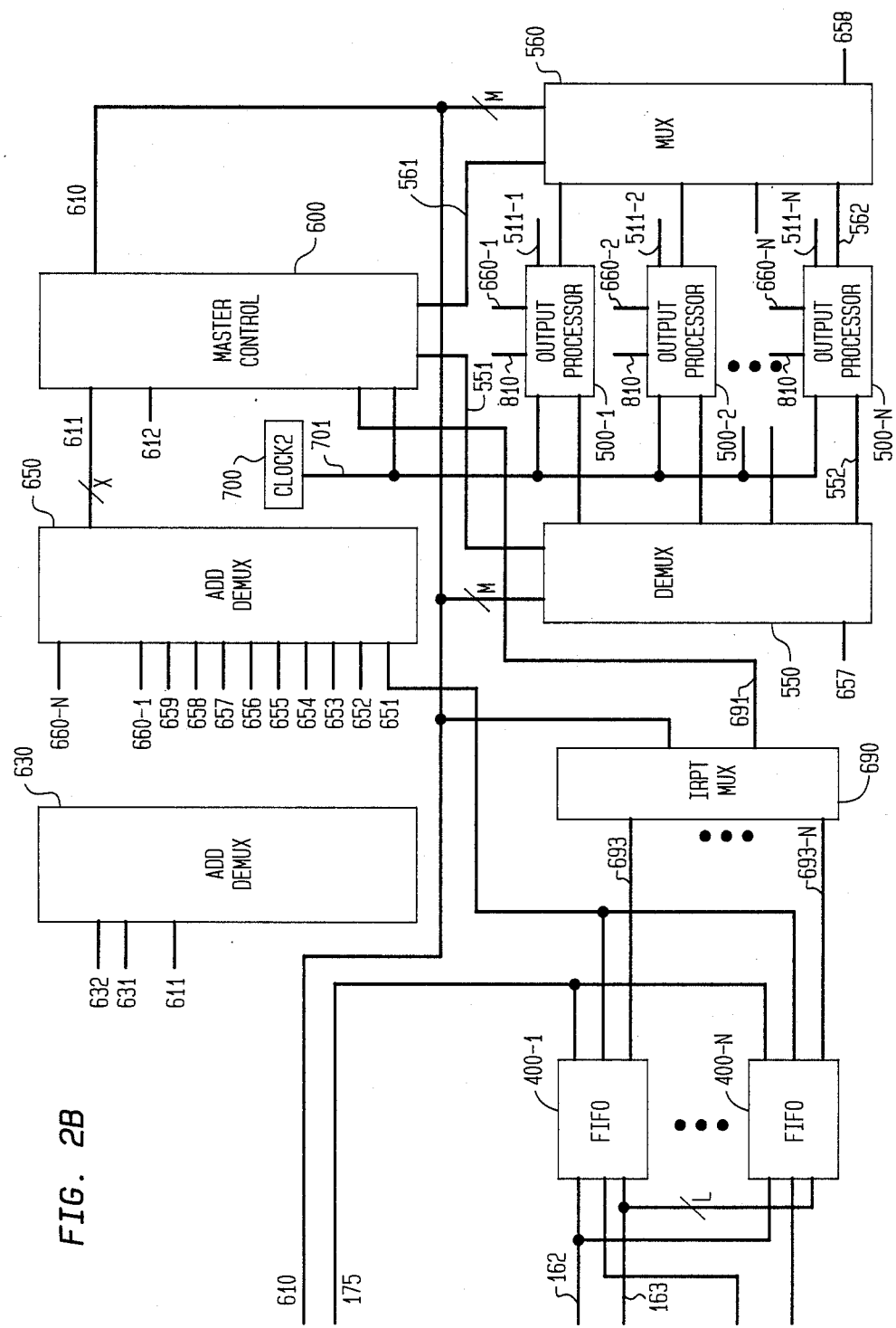
FIG. 2 (which comprises figure part 2a and 2b) is a more detailed diagram of the telecommunications interface of FIG. 1.

The input section 10 of the telecommunications interface is shown schematically in FIG. 2a. Data is input to the telecommunications interface on line 101, of clock recovery and framing circuit 100, in the form of digital packets. The first bits of the incoming packet are used to reestablish a clock frequency corresponding to that of the incoming packet, and are then fed to the input clock 190 on line 102. The input clock 190 maintains this clock frequency for the duration of the incoming packet. The output of the clock recovery and framing circuit 100 is stripped of any timing information.

The output of the clock recovery circuit 100 on line 103 is input to one of two high speed shift registers 110 and 120. A particular shift register is selected by a T-type flip-flop circuit 130 which is initially reset to a known position by line 656 of the master control 600.

Register counter 180 counts the clock pulses and issues a pulse when either shift register 110 or 120 is full. This pulse toggles the flip-flop 130 via line 181 selecting the alternative shift register. The pulse is also sent via an "or" circuit 200 to the input address generator 160 and the dual port RAM 150. At this time, the data is transferred from the full shift register to the dual port RAM via N-bit bus system 105. The register counter 180 is reset via line 181 and "or" circuit 195 and the alternate shift register 110 or 120 begins to fill in exactly the manner described above. If the incoming signal is video, the output of the clock recovery circuit 100 on line 103 is also connected to a standard sync separator chip 15. The sync separator chip 15 produces a composite blanking signal on line 16 which inhibits the clock output at gate 17 during the horizontal and vertical blanking intervals of the video signal. This process causes only the active portion of the input video signal to be inputted to the shift registers 110,120 and hence to the dual port RAM 150.

The input address generator 160 determines the storage location for incoming data packets in dual port RAM 150. Input address generator 160 is initialized by the master control 600 over an M-bit wide bus 610 and control line 653. It changes the address to the dual port RAM 150 in response to signals on line 161 from register counter 180 via line 181 and "or" gate 200. Alternatively, the address generator 160 may be controlled by the master control processor 600 via the bus 611 and the control line 654 which enables the master control processor 600 to communicate with the "or" gate 200.

The input address generator 160 writes a copy of each dual port RAM address to one of several first-in-first-out (FIFO) memories 400-1 . . . 400-N via line 162 and bus 163 of width L. The specific FIFO may be determined by the leading M bits, 111 and 121, in the shift register 110 or 120 currently being transferred to the dual port RAM 150. The M Bits 111 and 121 are input to an "or" switch 220 via an M bit bus 122. The "or" switch 220 is actually an "or"-ed M-bit bus. The "or" switch 220 could be, for example, a 74LS 442, a standard TTL integrated circuit. The leading M-bits, 111 or 121 are written into a latch 230 under control of "or" circuit 200 which latch 230 is then decoded by the FIFO select 300. Alternatively, the FIFO to which a given address is routed, may be determined by the master control processor 600 via bus 610, which is connected to "or" circuit 220. Control of the "or" switch 220 is via line 652 coming from the address demultiplexer 650, and, in turn the master control 600.

This completes the description of data flow between the serial data input line 101 and the dual port RAM 150. At this point, user data is stored in the RAM 150 and address data is stored in the FIFOs, 400-1 . . . 400-N. The address data stored in the FIFOs enables particular output processors, 500-1 . . . 500-N to fetch and process particular data from the dual port RAM 150.

Another path to the input of the dual port RAM 150 is through a feedback register 140. Latch 570 is written to by the master control 600 via line 655 and the m-bit bus 610. Latch 570 controls the enable pins of shift registers 110 and 120 via line 571 and feed back latch 140 via line 572. Either registers 110 and 120 or register 140 can be active at any one time. Register 140 provides access to the dual port memory 150 input for any data that has been processed by an output processor 500-1 . . . 500-N and is to be rewritten back into the dual port RAM. This allows data in the dual port RAM 150 to be processed by an output processor and stored for later use.

Data rewritten into the dual port RAM 150 after processing by an output processor may have a different destination than the data had when it was originally written into RAM 150. In particular, one output processor e.g. 500-1 might first do a data conversion of some sort and then another processor e.g. 500-2 might control the transmission of the data to a display device or other user equipment. Thus, the storage address of data rewritten into the RAM 150 may have to be routed to a different FIFO than when the data was first written into the RAM 150. To accomplish this, latch 230 is written to the master control 600 by way of M-bit bus 610 and "or" switch 220 and by way of line 654 and "or" gate 200. Using this circuitry, the address for data rewritten in to the dual port RAM via the feedback latch 170 can be redirected to another FIFO 400-1 . . . 400-N.

4. Output Data Flow

The FIFO memories 400-1 . . . 400-N provide an asynchronous interface between input data on line 101 and output data on line 511-1 . . . 511-N of the output processors 500-1 . . . 500-N. Whenever a flag e.g. 693-1

... 693-N, on any FIFO is active, the interrupt multiplexer 690 sends an interrupt to master control 600 via line 691 indicating that data is available for one of the output processors 500-1 ... 500-N. Once an interrupt from the interrupt multiplexer 690 is received by the master control processor 600, an address is fetched from a FIFO 400-1 ... 400-N. This can be done using a simple polling process in simple systems, and using priority interrupt schemes in more complicated systems.

The fetched address is supplied to the output address latch 170 via L-bit bus 175. Following the transfer of data from dual port RAM 150 to the output buffer 540, the address is routed back to the input address generator 160 via line 173 so that it can be used again. The input and output of the dual port RAM 150 operate totally asynchronously. Thus, address contention is virtually impossible in this scheme because of the fixed number of unique addresses issued by the address generator 160. Desirably, this helps to guarantee that the input and output addresses presented to the dual port RAM can never be the same.

The output data on N-bit wide bus 151 is input to a general purpose buffer 540. The purpose of the buffer is to supply data to various output processors 500-1 ... 500-N on data bus system 810. The specific bus width of bus system 810 is variable and is specified to the output buffer 540 by the master control via the M bit bus 610. The master control processor also specifies the output processor 500-1 ... 500-N via the demultiplexer 550 using the M-bit bus 610. The function of the demultiplexer 550 is to physically activate the particular output processor selected by the master controller 600. For example, line 552 coming out of the demultiplexer 550 may be used by the master controller 600 to select output processor 500-N.

Typically, each output processor 500-1 ... 500-N can be completely different in type. Processor types include video and graphics display interfaces, ethernet interfaces, UNIX interfaces, printer interfaces, terminal interfaces, FAX interfaces, signal and data processors, and display formating devices. A desirable feature is that an arbitrary number of output processors can be easily added, each interacting with an external device in a completely independent manner.

The overall speed potential of the inventive interface comes from the inherent block move characteristic of the dual port memory. Each time an address from a FIFO 400-1 ... 400-N is fetched, N-bits of information are transferred to an output processor 500-1 ... 500-N. The throughput of the interface can be as high as N-times the FIFO transfer rate. Typical numbers today are 15 million addresses per second for a FIFO. For N equal to 128, this gives a throughput of about 2 Gbps. This implies dual port memory access times of 65 ns, which are in line with currently available components.

Each output processor 500-1 ... 500-N can communicate with the master control processor 600 via interrupt multiplexer circuit 560 and bus 610. For example, line 562 from output processor 500-N would be used to signal the master control 600 that output processor 500-N wishes to receive data transmitted to the interface from a particular user source, such as user #1. The master control 600 knows that addresses of data from user #1, are stored in a particular FIFO such as FIFO 400-1. The master control 600 orchestrates the fetching of addresses from FIFO 400-1. These addresses are then used to access the appropriate data from the memory 150, which data is then routed to output processor 500-N.

5. Other Interface Features

Clocks for the serial data input line 101 and the rest of the interface are asynchronous. Timing information is derived for each incoming data packet by clock recovery circuit 100, which information is used to drive clock 190. The rest of the interface may be controlled by clock 700 which is distributed via line 701. Output processor activities are in general either related to the clock 700 or are run using some other asynchronous clock mechanism.

An "up/down" or other counter (not shown) is used to indicate whether the RAM 150 is empty, full or halfway in between. The primary purpose of this counter is to indicate whether the dual port RAM is being filled faster than it is being emptied. If the dual port RAM is being filled faster than it is being emptied, appropriate algorithms employed by the master control processor 600, might be used to route data to output processors 500-1 ... 500-N in such a way as to empty the dual port RAM more quickly. The "up/down" counter need not be a discrete circuit. Illustratively, the "up/down" counter may be a memory location or register in the control processor 600.

When the "up/down" counter indicates that the dual port RAM 150 is full, algorithms employed by the master control processor 600 may be used to resolve this condition. The condition might indicate that one of the output processors 500-1 ... 500-N is not functioning. In this regard, half full and full flags in each of the FIFO's 400-1 ... 400-N can be used by the master control processor 600 to suggest various priority strategies. It is the function of the master control processor 600 to insure that the dual port RAM 150 never fills up, in which case incoming data on line 101 will be lost. The master control processor 600 may do this by continually polling the FIFO's 400-1 ... 400-N and by altering the polling priorities of each FIFO to insure that dual port RAM 150 is emptied at an appropriate rate. One of the output processors 500-1 ... 500-N may comprise a null device which is used only to dispose of data stored in the dual port RAM 150.

6. Initialization

One of the functions of the master control 600 is to initially configure the interface to establish communication between particular user sources and particular output processors and their associated receiving devices. First the register counter 180, toggle flip-flop 130 and the input address register 160 are reset. Sequential dual port RAM 150 addresses are placed in the input address generator 160 starting with value zero. Next, the FIFO'S 400-1 ... 400-N are mapped on to the output processors 500-1 ... 500-N. In addition, the FIFO select circuit 300 is programmed under the control of the master control processor 600 so that the addresses of particular incoming data packets are routed to particular FIFO's. One possible approach here is to use defaults, based on an agreed upon convention for the meaning of the M-bit patterns in the incoming packets.

Another approach is to communicate with the users of the of the interface and establish a first mapping between the sources of incoming packets and particular FIFO's and a second mapping between the FIFO's and the output processors. As each user is connected to the interface, it sends information to the interface describing its terminal equipment along with significant protocol information. This information is routed by way of one of the output processors to the master control 600 which appropriately configures the interface, i.e. the master control processor establishes the two aforementioned mappings.

7. Application as a Video Bridge

In this application it is assumed that four remotely located users wish to participate in a video conference. Each conferee has at his/her location a standard 525-line color camera, a 525-line color display device, a 1024-line graphics scanner or a facsimile scanner, a 1024-line display device or a 1024-line facsimile receiver, a pointing device such as a light-pen and a key board. Preferably, the audio is transmitted separately, or is sampled at the video line rate of 15,734 Hz, and is inserted as a digital signal in the horizontal blanking period of the video signal. In the latter case, the audio signals are processed through the telecommunications interface as part of the video signal and are separated by the user receivers.

To set up a video conference call, the initiator of the call dials into the network that he/she wishes to access a telecommunications interface configured as a video bridge. The network assigns and connects the conferees to the bridge via line 101. As each conferee is connected, it sends information describing its terminal equipment along with significant protocol information to the interface. This information is transferred to the master control 600 by way of an output processor specifically allocated for this purpose. The master control 600 then assigns each conferee one of the output processors 500-1 . . . 500-N which matches the conferee's terminal equipment and sends a signal via another one of the output processors to the network to connect each conferee to his assigned output processor. In this case, the output processors assigned to the four conferees could be output processors 500-1, 500-2, 500-3 and 500-4 (not shown explicitly).

At this point it is assumed that all conferees are connected to the bridge via line 101 and the four input video signals arrive at the video bridge (i.e. the interface) in packetized format in a time division multiplexed fashion. It is also assumed that under the control of master control 600 a mapping between the four sources of incoming packets and particular FIFO'S, and a mapping between the output processors 500-1,500-2,500-3,500-4 and particular FIFO'S is established.

Although the packetized video signals from the four conferees arrive in sequence on line 101, their framing signals may be asynchronous. Illustratively, each of the four video signals is composed of the same number of lines per frame and the same number of picture elements per line. Typically, there are 512 lines per frame and 512 picture elements per line.

The input video signals from the four conferees are blocked into groups of 128 bits (equal to 16 picture elements quantized to 8-bits per picture element). In order to simplify processing by the telecommunications interface, the input signals are received as component signals of the form R (red), G(green), and B(blue) or Y, I, and Q. The component color video signals arrive, eight bits per component, at the input line 101, in sequential order of red, green, and blue, or Y,I, and Q, etc., and are inserted into the shift registers 110 and 120 in the same order. Each shift register, when full, contains six sets of the three color components. In order to simplify addressing and to correlate the three components, the RAM memory 150 is configured in three levels where each level stores one of the color components. Thus every set of R bits is stored in a first level of RAM 150, every set of G bits is stored in a second level of RAM 150, and every set of B bits is stored in a third level of RAM 150.

In sequence, a shift register 110 (see FIG. 2) is filled with 128 bits of video information plus M-bits of header information which is accounted for by the register counter 180. When the register counter 180 reaches a count of 128 it causes the next 128 bits to be entered into a shift register 120 and the bits in the full shift register 110 are parallel loaded into the RAM 150 in the correct memory color planes. The register counter 180 also signals the address generator 160 that a block of bits is being entered into RAM 150. During the horizontal and vertical blanking periods of the input video signals, the sync separator circuit 10 prevents data from being written into the dual port RAM 150.

The address outputted by address generator 160 is inputted to the appropriate FIFO. Although the four input video messages from the four conferees may effectively be entered into the RAM 150 in random order in blocks of 128 bits, the FIFO's store the "random" memory locations so the messages may be fetched later in the correct sequence. The address generator 160 generates a base address for each block of data plus two extra bits to define each of the three color planes. A fourth combination is added to the base address and passed to the FIFO's which will interpret the fourth combination to mean all three memory planes are to be accessed by the base address simultaneously. This allows the three memory planes of RAM 150 to be used, as a full sequential memory for non-color messages.

The output of the four video images may be done in one of at least three ways. First, a conferee may select any one of the other conferees to be displayed on a 525-line receiver with full resolution. Alternatively, all four conferees are displayed on a 525-line receiver where each input image is 2:1 spatially subsampled in each spatial dimension, or the four images may be outputted and displayed as full resolution (525 line resolution) on a 1024-line display device. The conferee sends his selection to the interface, which is configured in the proper output configuration by the master control processor 600.

In the first case, where one of four pictures is selected, the receiving conferee is associated, by way of master control processor 600 with the FIFO which contains the RAM 150 addresses for the picture to be received. The bits comprising that picture are accessed from the RAM 150 and are passed to the output buffer 540 whose output is accepted by the output processor 500-1, 500-2, 500-3 and 500-4 assigned to the receiving conferee. Illustratively, the output processor comprises a pair of shift registers for each of the color planes RAM 150 which operate in a ping-pong manner similar to input shift registers 110 and 120.

The output processor has a sync generator for its output signal which is locked to the master control 600 clock signal. During the horizontal and vertical blanking intervals of the video signal outputted by the output processor, the sync generator inhibits clock signals to the appropriate FIFO, thus preventing access to the RAM 150. At the start of the active picture time, it enables the clock to the FIFO, which causes the picture signals to be fetched from the RAM. When the correct number of active pels per line, for instance 512 have been fetched, the sync generator produces a horizontal blanking signal and inhibits the clocks to the FIFO, etc. This sequence continues until the conference is ended or the conferee changes his request.

Next, consider the receiving conferee selecting to view a composite of the four pictures, when each picture occupies one quadrant of the receiving conferees 525-line display. The processing of the signals is as follows. First, the receiving conferees assigned output processor must access all four FIFO'S and use only ¼ of the information which each FIFO points to. One half of each input picture signal is dropped by addressing only one field of each. (Note each input picture of 512 lines comprises two 256 line interlaced fields). The sync generator in the receiving conferees assigned output processor controls access to the RAM memory 150 in the following way.

Assume the addresses of the four input picture signals are stored in sequential order in FIFO'S 400-1, 400-2, 400-3 and 400-4 (not explicitly shown). With the output pictures start of active field signal, FIFO 400-1 is enabled and it causes RAM 150 to output the first 512 pel line of the first field of picture #1 at twice the normal clock rate to the receiving conferees assigned output processor. These bits are stored in the output processor's parallel loaded shift-registers where the sequential output of the shift registers is also clocked at twice the normal rate, and every other pel is skipped by sampling the serial stream at the normal clock rate. Thus 256 of the 512 pels comprising the first line of the first field of picture #1 are passed to the receiving conferee. This is one half of one line in the first field of the video signal received by the receiving conferee.

At the end of the 256 pel count, FIFO 402 containing the addresses of picture #2 is enabled and the signals retrieved by it are processed in the same manner as those signals retrieved by FIFO 401. After 256 pels of the first line of the first field of input picture #2 have been outputted by the receiving conferee's output processor for a total output of 512 pels (which comprises the first line of the first field of the output video signal received by the receiving conferee), the addresses for the second line of the first field of input pictures #1 and #2 are outputted in the above described fashion. This process is continued such that odd-numbered lines of field one of input picture #1 and #2 are outputted as field one of the output signal and even numbered lines of field one of the input pictures #1 and #2 become field two of the output video signal. After 256 lines of the output picture signal have been selected from input pictures 1 and 2, the next 256 lines of the output picture are selected from input pictures #3 and #4 in the same manner as described above for the input pictures 1 and 2. Thus, input pictures #1 and #2 form the top half of the output video display and input pictures #3 and #4 form the bottom half of the output video display.

For outputting a combined 1024-line picture for all four conferees, the process is similar, except that the accessing and transmission rates are four times greater. Therefore, no subsampling of data accessed from RAM 150 is necessary.

Finally, the above described embodiments of the invention, are intended to be illustrative only. Numerous alternative embodiments may be devised, by those skilled in the art, without departing from the spirit and scope of the following claims.

What is claimed is:

1. A telecommunications interface for receiving asynchronous input data packets at preselected input bit rates and employing preselected input protocols from one or more user sources and for retransmitting the input data at preselected output bit rates and employing preselected output protocols compatible with the requirements of one or more reeiving devices, said telecommunications interface comprising:
a memory for storing data contained in said input data packets,
input means for sequentially receiving said asynchronous input data packets, stripping said packets of protocol information, and sequentially writing said data contained in said input packets into said memory,
an address generator for generating the address in said memory where each of said input data packets is stored,
address storage means for storing in an organized fashion addresses generated by said address generator, and
means for retrieving particular addresses from said address storage means, means for retrieving the data stored in said memory means at said retrieved addresses, and output processors for receiving said retrieved data and for retransmitting said retrieved data at said preselected bit rates and employing said preselected protocols to said receiving devices.

2. The telecommunications interface of claim 1 further including means for returning said retrieved addresses to said address generator so that said retrieved addresses can be reused to store subsequently received input data packets.

3. The telecommunications interface of claim 1 wherein said memory is a dual port random access memory having an input and output capable of operating asynchronously with respect to one another, so that data from an input data packet can be written into said memory at one address, while data from another data packet, previously written into said memory at another address can be read out of said memory.

4. The telecommunications interface of claim 1 wherein said input means includes means for removing timing and source identification information from each incoming data packet.

5. The telecommunications interface of claim 1 wherein
said address storage means comprises a plurality of storage portions,
each of said input data packets includes address routing information, and
said interface further includes routing means for routing memory addresses generated by said address generator for each input data packet to a particular portion of said address storage means depending on the address routing information in the packet.

6. The telecommunications interface of claim 1 wherein
said address storage means comprises a plurality of first-in-first-out (FIFO) memories, and
said telecommunications interface further comprises a central control processor, said processor providing a mapping between said output processors and said FIFOs so that when an address is retrieved from a particular FIFO, and the data stored at the retrieved address is accessed from said memory, said accessed data is routed to a particular output processor.

7. The telecommunications interface of claim 1 wherein said address storage means comprises a plurality of first-in-first-out (FIFO) memories.

8. The telecommunications interface of claim 7 wherein each of said incoming data packets includes address routing information and wherein said interface further includes routing means for routing the memory address generated by said address generator for each incoming data packet to a particular one of said FIFO memories depending on the address routing information contained in the packet.

9. The telecommunications interface of claim 7 wherein each of said incoming data packets includes information identifying its source and wherein said interface includes routing means for routing memory addresses generated by said address generator for each incoming data packet to a particular one of said FIFO memories based on the surface identifying information in the packet.

10. The telecommunications interface of claim 1 wherein
said address storage means comprises a plurality of storage portions, and wherein
at least some of said output processors are associated with particular ones of said storage portions, so that when an address is retrieved from a particular storage portion and the data stored at the retrieved address is accessed from said memory, the accessed data is routed to a particular output processor.

11. A telecommunications interface for receiving input data packets from one or more user sources and for retransmitting the input data in a format compatible with and for use by one or more receiving devices, said telecommunications interface comprising:
a memory for storing said input data packets,
input means for sequentially receiving said input data packets and sequentially writing said input packets into said memory, wherein each incoming data packet includes clock frequency data and user data and wherein said input means comprises
clock recovery means for recovering the clock frequency data of each incoming data packet,
clock means for maintaining the recovered clock frequency for the duration of each incoming packet,
shift register means including at least first and second shift registers for receiving the user data in each incoming packet after the clock frequency data has been removed therefrom, said user data being clocked into said shift register means at a rate determined by said recovered clock frequency data, and
means for writing said user data into said memory when said first or second shift register is full,
an address generator for generating the address in said memory where each of said input data packets is stored,
address storage means for storing in an organized fashion addresses generated by said address generator, and
output means for retrieving particular addresses from said address storage means, for accessing the data stored in the said memory at said retrieved addresses, and for retransmitting said accessed data to a particular receiving device.

12. The telecommunications interface of claim 11 wherein said input data packets are comprised of video signals and wherein said input means further comprises a sync separator circuit for inhibiting the transfer of data from said input means to said memory during the horizontal and vertical blanking intervals of said video signals.

13. A telecommunications interface for receiving input signals from one or more user sources and for retransmitting the input signals in a format compatible with and for use by one or more receiving devices, said telecommunications interface comprising
a dual port random access memory,
input means for receiving said input signals from said user sources and for writing said input signals into said dual port random access memory,
an address generator for generating the addresses in said random access memory where said input signals are stored,
a plurality of first-in-first-out (FIFO) memories for storing the addresses generated by said address generator,
routing means for routing the addresses of input signals from particular ones of said user sources to particular ones of said FIFO memories,
a plurality of output processors, at least some of said output processors being associated with one or more of said FIFO memories,
means for retrieving addresses from at least some of said FIFO memories,
means for accessing the signals stored at said retrieved addresses in said dual port random access memory,
means for routing the accessed signals to an output processor associated with the FIFO memory from which the address of said accessed signal was retrieved, said output processors being capable of retransmitting the accessed signals to particular ones of said receiving devices, and feedback means so that signals routed from said memory to one of said output processors can be rewritten in said dual port random access memory.

* * * * *